United States Patent
Wang et al.

(10) Patent No.: US 10,662,786 B2
(45) Date of Patent: May 26, 2020

(54) CMC ARTICLES HAVING SMALL COMPLEX FEATURES FOR ADVANCED FILM COOLING

(71) Applicant: General Electric Company, Schenectady, NY (US)

(72) Inventors: Anquan Wang, Mason, OH (US); Wilbur Douglas Scheidt, Green Township, OH (US); Jeffrey Lehmkuhl, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 653 days.

(21) Appl. No.: 14/993,366

(22) Filed: Jan. 12, 2016

(65) Prior Publication Data
US 2017/0198911 A1   Jul. 13, 2017

(51) Int. Cl.
| F01D 5/00 | (2006.01) |
| F01D 5/28 | (2006.01) |
| F23R 3/00 | (2006.01) |
| F01D 5/18 | (2006.01) |
| F01D 25/12 | (2006.01) |

(52) U.S. Cl.
CPC .............. *F01D 5/288* (2013.01); *F01D 5/186* (2013.01); *F01D 25/12* (2013.01); *F05D 2260/202* (2013.01); *F05D 2300/6033* (2013.01); *F23R 3/002* (2013.01); *F23R 3/007* (2013.01); *F23R 2900/00018* (2013.01); *F23R 2900/03041* (2013.01); *F23R 2900/03042* (2013.01); *Y02T 50/672* (2013.01); *Y02T 50/675* (2013.01)

(58) Field of Classification Search
CPC .... F23R 2900/03041–03042; F05D 2260/202; F05B 2260/202; F01D 5/186
See application file for complete search history.

(56) References Cited

U.S. PATENT DOCUMENTS

| | | | | |
|---|---|---|---|---|
| 4,383,854 A * | 5/1983 | Dembowski | .............. | B22F 5/04 419/1 |
| 4,653,983 A * | 3/1987 | Vehr | ........................ | B23H 9/10 415/115 |
| 4,762,464 A * | 8/1988 | Vertz | ........................ | B23H 9/10 219/69.1 |
| 6,165,600 A * | 12/2000 | Ivkovich, Jr. | ........... | B32B 18/00 123/1 R |
| 6,918,742 B2 | 7/2005 | Liang | | |

(Continued)

*Primary Examiner* — Todd E Manahan
*Assistant Examiner* — Katheryn A Malatek
(74) *Attorney, Agent, or Firm* — Dority & Manning, P.A.

(57) ABSTRACT

An engine component is generally provided for a gas turbine engine generating hot combustion gas flow. In one embodiment, the engine the engine component includes a substrate having a hot surface facing the hot combustion gas flow and a cooling surface facing a cooling fluid flow. The substrate defines a film hole extending through the substrate and having an inlet provided on the cooling surface, an outlet provided on the hot surface, and a passage connecting the inlet and the outlet. The passage defines a diffusion section having a pair of side passage walls extending to the outlet on the hot surface, with each of the side passage walls within the diffusion section having a surface roughness (Ra) of about 4 mils to about 7 mils. Methods are also provided for forming a film hole in a CMC substrate.

16 Claims, 5 Drawing Sheets

(56) References Cited

U.S. PATENT DOCUMENTS

2013/0205791 A1\* 8/2013 Mongillo, Jr. .......... F01D 5/186
 60/754
2016/0023272 A1\* 1/2016 Mongillo, Jr. .......... B22F 5/009
 416/95

\* cited by examiner

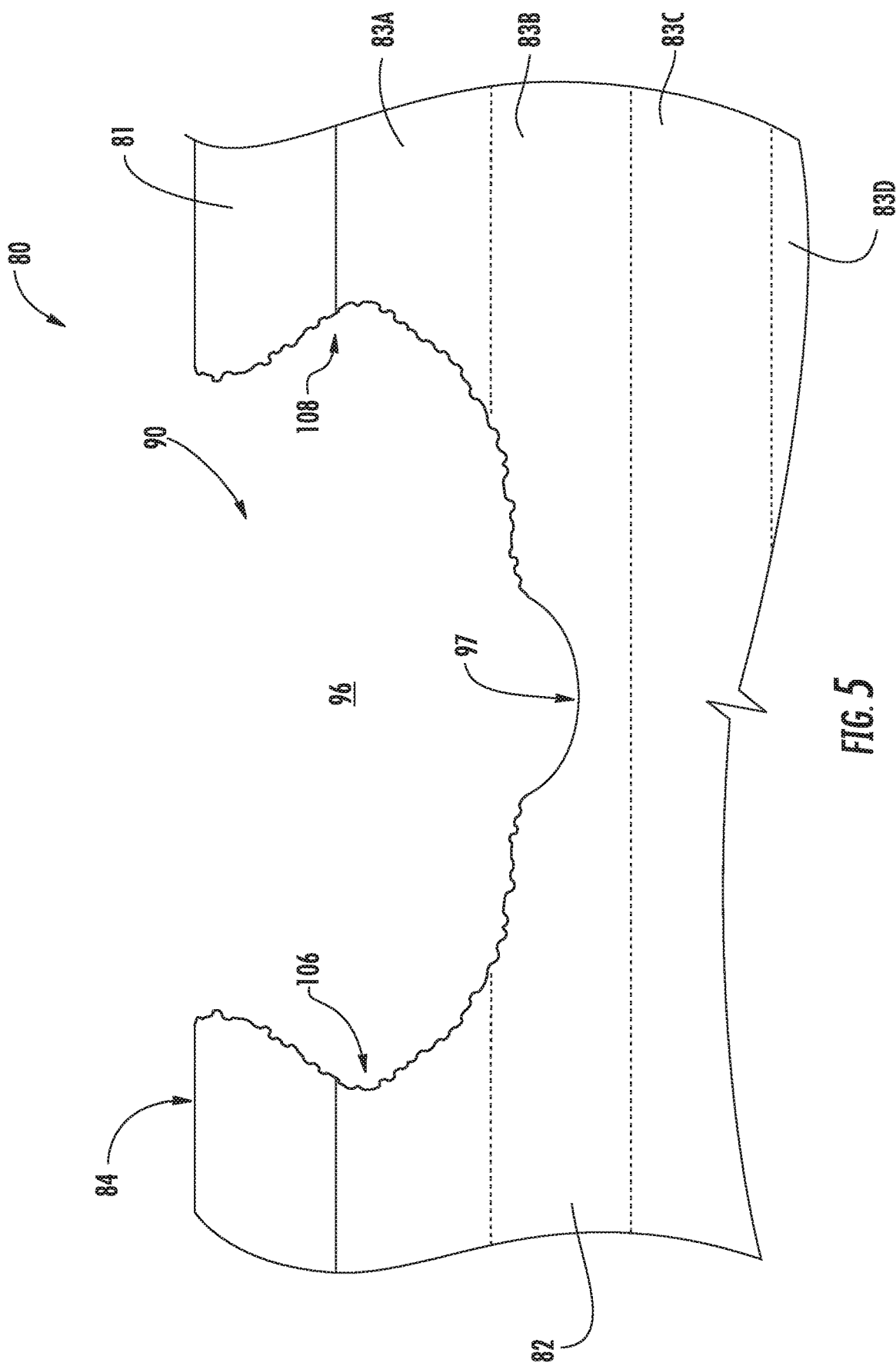

CMC ARTICLES HAVING SMALL COMPLEX FEATURES FOR ADVANCED FILM COOLING

FIELD OF THE INVENTION

The present invention relates generally to ceramic matrix turbine engine components, and more particularly, to a ceramic matrix composite gas turbine engine component having small complex features.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. The higher temperatures reach and surpass the limits of the material of the components in the hot section of the engine and in particular the turbine section of the engine. Since existing materials cannot withstand the higher operating temperatures, new materials for use in high temperature environments need to be developed.

As the engine operating temperatures have increased, new methods of cooling the high temperature alloys comprising the combustors and the turbine airfoils have been developed. For example, ceramic thermal barrier coatings (TBCs) and/or environmental barrier coatings (EBCs) have been applied to the surfaces of components in the stream of the hot effluent gases of combustion to reduce the heat transfer rate, provide thermal protection to the underlying metal and allow the component to withstand higher temperatures. These improvements help to reduce the peak temperatures and thermal gradients of the components. Cooling holes have been also introduced to provide film cooling to improve thermal capability or protection. Simultaneously, ceramic matrix composites have been developed as substitutes for the high temperature alloys. The ceramic matrix composites (CMCs) in many cases provide an improved temperature and density advantage over metals, making them the material of choice when higher operating temperatures and/or reduced weight are desired.

CMCs have relatively low thermal conductivities and are thus well suited for use in high temperature environments for long periods of time. CMC components in the hot gas are heavily film cooled, particularly in designs with otherwise uncooled trailing edges. However, improved film cooling performance can decrease the required cooling film flow and/or increase the durability of the CMC component.

BRIEF DESCRIPTION OF THE INVENTION

Aspects and advantages of the invention will be set forth in part in the following description, or may be obvious from the description, or may be learned through practice of the invention.

An engine component is generally provided for a gas turbine engine generating hot combustion gas flow. In one embodiment, the engine the engine component includes a substrate having a hot surface facing the hot combustion gas flow and a cooling surface facing a cooling fluid flow. The substrate defines a film hole extending through the substrate and having an inlet provided on the cooling surface, an outlet provided on the hot surface, and a passage connecting the inlet and the outlet. The passage defines a diffusion section having a pair of side passage walls extending to the outlet on the hot surface, with each of the side passage walls within the diffusion section having a surface roughness (Ra) of about 4 mils to about 7 mils.

In one particular embodiment, the passage also defines a metering section having a pair of side passage walls extending from the inlet on the cooling surface, with each side passage wall within the metering section having a surface roughness (Ra) of less than 1 mil (e.g., about 0.5 mil to 1 mil).

Methods are also provided for forming a film hole in a CMC substrate. In one embodiment, the film hole is formed by pulsing a laser into the cold surface of a substrate to form the film hole extending through the substrate from an inlet provided on the cooling surface to an outlet provided on the hot surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 5 is a schematic, cross-sectional view within the diffusion section of the film hole of component of FIGS. 3 and 4.

Figure 1:
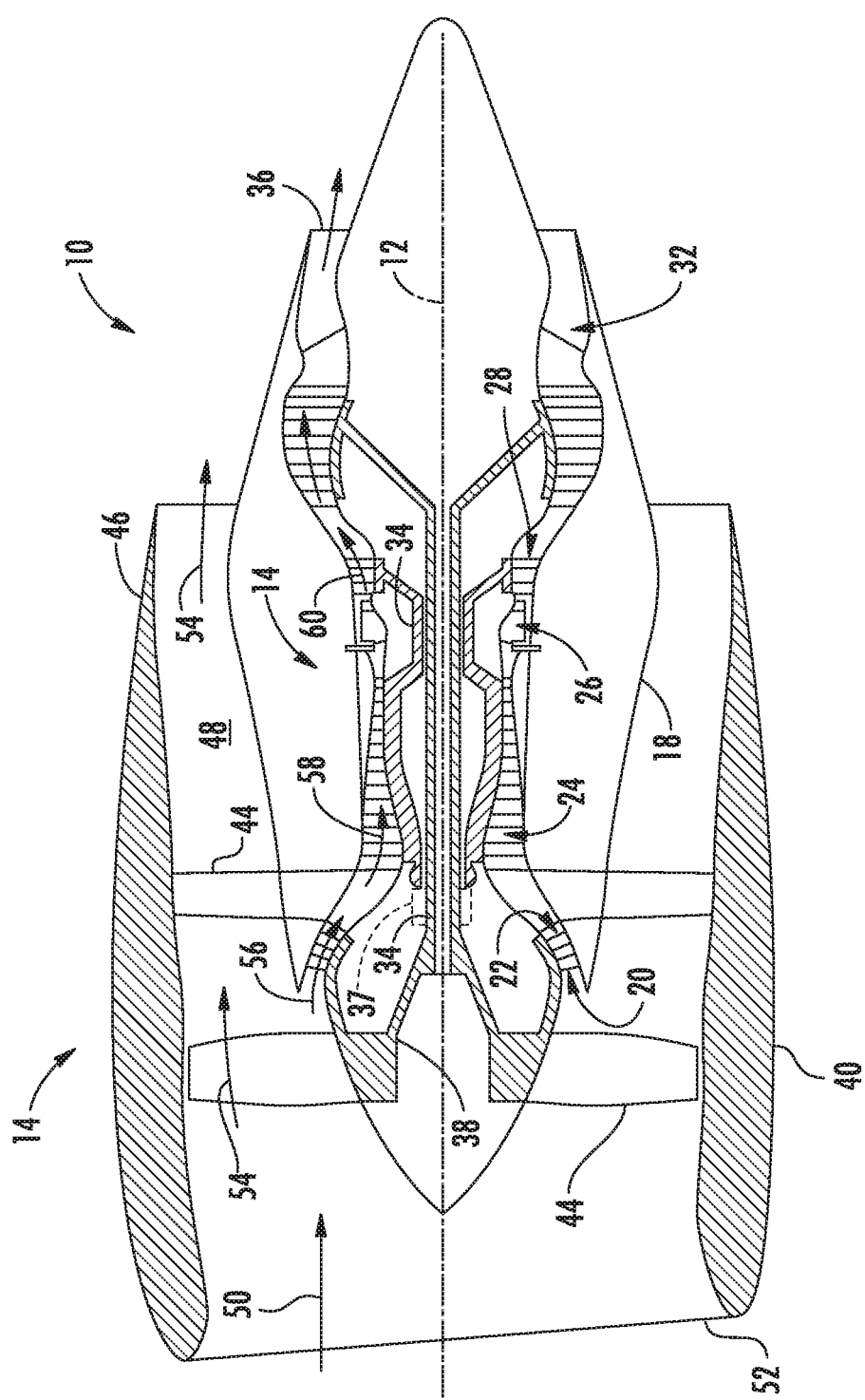
FIG. 1 shows a cross-sectional view of one embodiment of a gas turbine engine that may be utilized within an aircraft in accordance with aspects of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the phrases "constructed of CMCs" and "comprised of CMCs" shall mean components substantially constructed of CMCs. More specifically, the CMC components shall include more CMC material than just a layer or coating of CMC materials. For example, the components constructed of CMCs may be comprised or constructed substantially or entirely of CMC materials, including greater than about 50, 60, 70, 80, 90, or 100 percent CMC material.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure, HP) turbine 28 for driving the high pressure compressor 24 via a first (high pressure, HP) drive shaft 30, and then to a second (low pressure, LP) turbine 32 for driving the booster compressor 22 and fan section 16 via a second (low pressure, LP) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 30 may generally include one or more turbine stages, with each stage including a turbine nozzle and a downstream turbine rotor. As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. In particular embodiments, the (LP) drive shaft 34 may be connected directly to the fan rotor 38 such as in a direct-drive configuration. In alternative configurations, the (LP) drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
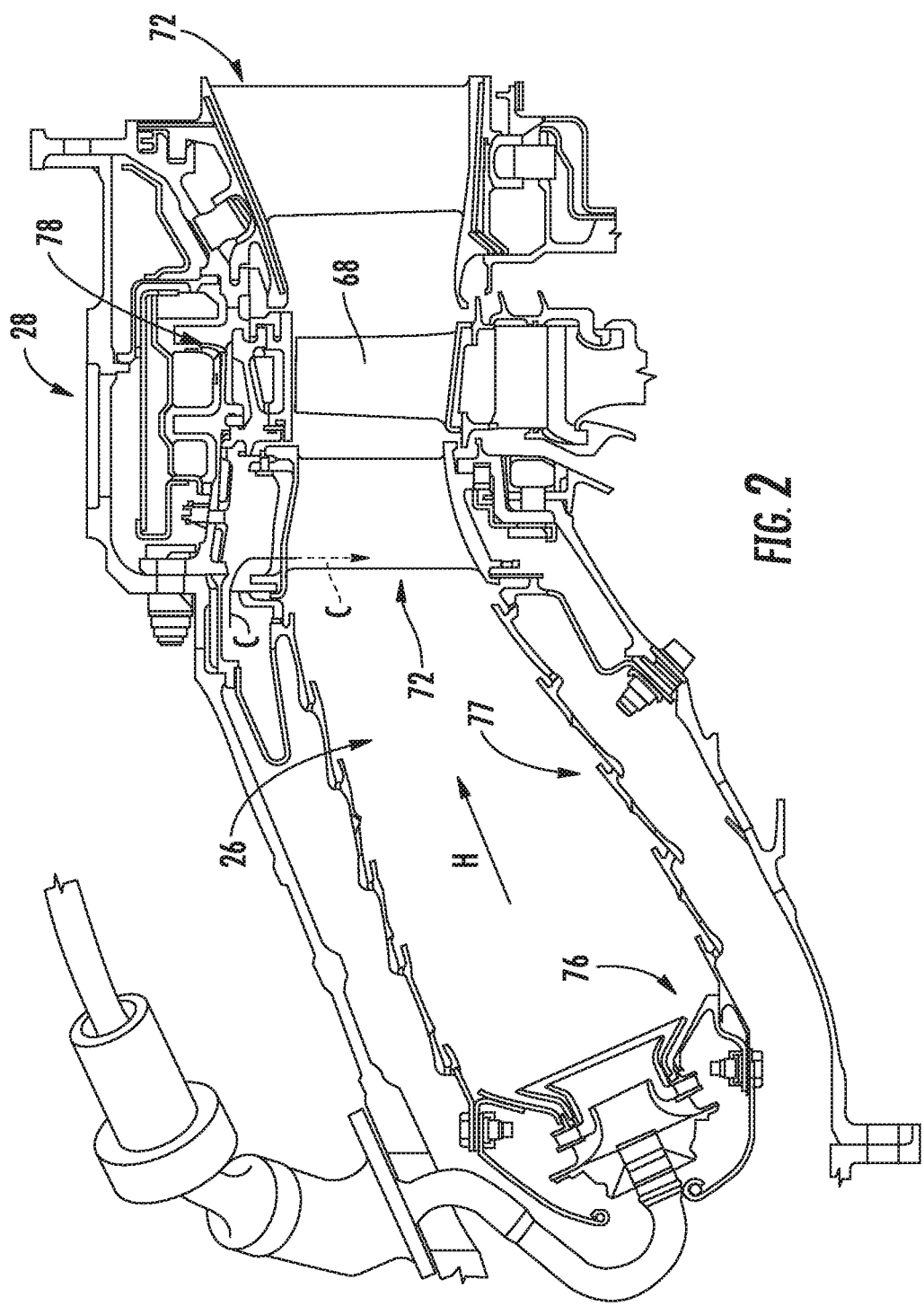
FIG. 2 shows a side section view of an exemplary combustor and a high pressure turbine of the engine from FIG. 1.

FIG. 2 is a side section view of the combustor 26 and first turbine 28 (i.e., the high pressure (HP) turbine) of the engine 10 from FIG. 1. The combustor 26 includes a deflector 76 and a combustor liner 77. Adjacent to the turbine blade 68 of the turbine 28 in the axial direction are sets of axially-spaced, static turbine vanes 72, with adjacent vanes 72 forming nozzles therebetween. The nozzles turn combustion gas to better flow into the rotating blades so that the maximum energy may be extracted by the turbine 28. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 28. Similar shroud assemblies can also be associated with the LP turbine 32, the LP compressor 22, or the HP compressor 24.

One or more of the engine components of the engine 10 includes a film-cooled substrate in which a film hole of an embodiment disclosed further herein may be provided. Some non-limiting examples of the engine component having a film-cooled substrate can include the blades 68, vanes or nozzles 72, combustor deflector 76, combustor liner 77, or shroud assembly 78, described in FIGS. 1-2. Other non-limiting examples where film cooling is used include turbine transition ducts and exhaust nozzles.

Figure 3:
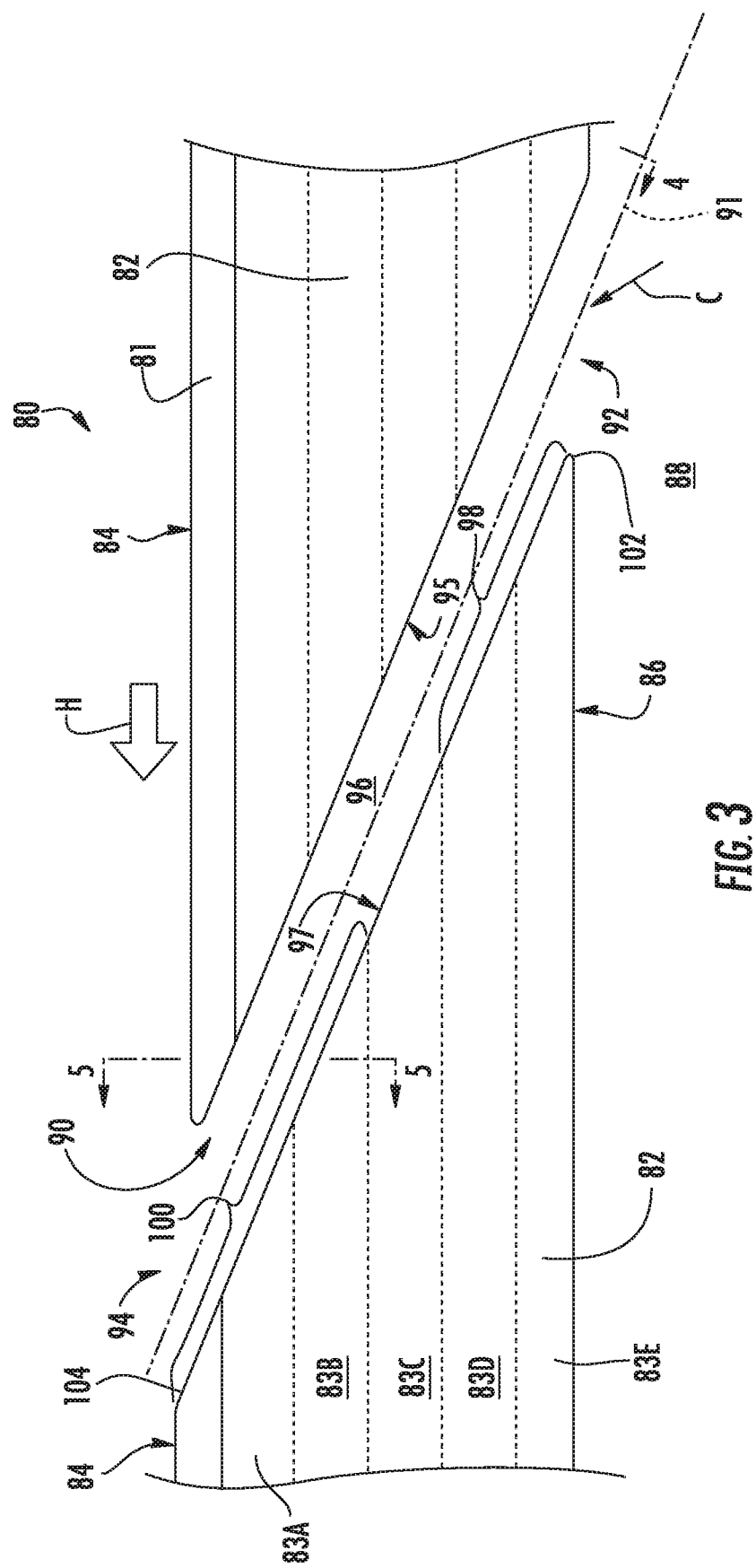
FIG. 3 is a schematic, cross-sectional view through a film hole of an exemplary engine component of the engine from FIG. 1 according to one embodiment.
Figure 4:
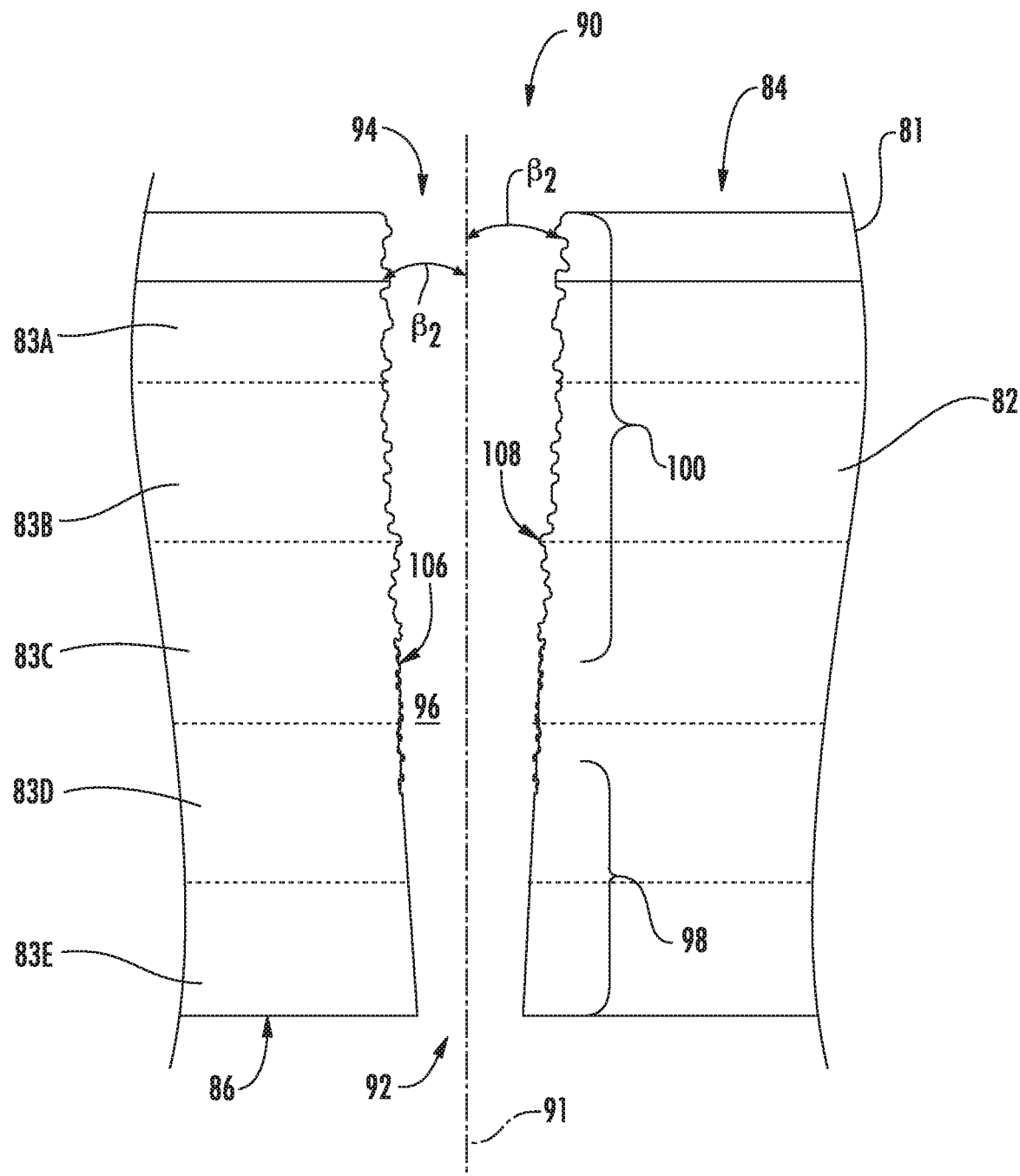
FIG. 4 is a schematic, cross-sectional view through the center axis of the film hole of component of FIG. 3.

FIGS. 3-5 are schematic views of different cross-sections of an exemplary engine component 80 formed from a CMC substrate 82 defining at least one film hole 90 therein. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be first compressed air flow 54 which bypasses the engine core 14, fluid from the LP compressor 22, or fluid from the HP compressor 24.

The engine component 80 includes a substrate 82 having a hot surface 84 facing the hot combustion gas flow H and a cooling surface 86 facing the cooling fluid C. The substrate 82 may form a wall of the engine component 80; the wall may be an exterior or interior wall of the engine component 80. No matter the location or type of component within the engine, the hot surface 84 of the substrate 82 is exposed to hot gasses within the engine. The first engine component 80 can define at least one interior cavity or channel 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

In one particular embodiment, the substrate 82 is constructed from a ceramic matrix composite (CMC) material, which is a non-metallic material having high temperature capability. Exemplary CMC materials utilized for such substrate 82 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

In one embodiment, the CMC material is formed from a plurality of layers (e.g., about 4 to about 10 layers) in its thickness, shown as plies 83A, 83B, 83C, 83D, and 83D in FIGS. 3-5. The CMC material is formed into plies of material having thicknesses of about 25 μm to about 475 μm, and most typically about 125 to about 400 inches. The thicknesses of the plies are usually dictated by the size of the fiber tows (filament bundles) selected for use, and the thicknesses of the plies may vary with fiber diameter. For most of the applications considered herein, the plies are formed as two-dimensional woven fabric, although one-dimensional fiber orientation may also be used. However, the method of manufacturing the plies, laying up the plies to form the component part and other parts manufacturing technology used in the composite industry are not meant to limit the present invention. The plies are laid up to form the shape of the article being formed, the angles of the adjacent plies may vary depending on the planar strength required. The components that can be made using these CMC materials include but are not limited to turbine blades, turbine vanes, turbine shrouds, and combustor liners, casings, heat shields and diffusers. These hot section components all benefit from the use of cooling air to provide sufficient cooling to accomplish heat transfer during engine operation, thereby extending their range of use.

As shown, the engine component 80 is formed from a substrate 82 of a CMC material with an environmental barrier coating (EBC) 81 what defines the hot surface 84 of the component 80. For example, the EBC can include a bond coat (e.g., comprising silicon or silica), one or more layers formed from one or more rare earth silicates (e.g., one or more of a mullite layer, a mullite-alkaline earth aluminosilicate mixture layer, an yttrium monosilicate (YMS) layer, an ytterbium doped yttrium disilicate (YbYDS) layer, a barium strontium aluminosilicate (BSAS) layer, etc.), etc. Additional coatings may also be present on the substrate, such as a thermal barrier coating, abrasive coatings, etc.

The engine component 80 further includes one or more film hole(s) 90 defined by the substrate 82 and extending through the substrate 82 that provide fluid communication between the interior cavity 88 and the hot surface 84 of the engine component 80. The film hole 90 has an inlet 92 provided on the cooling surface 86 of the substrate 82, an outlet 94 provided on the hot surface 84, and a passage 96 connecting the inlet 92 and the outlet 94. The passage 96 is generally defined between the upstream inner surface 95 and the downstream inner surface 97 within the passage 96. While only one film hole 90 is shown in FIG. 3, it is understood that the engine component 80 may be provided with multiple film holes 90, which be arranged in any desired configuration on the engine component 80.

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cooling surfaces 84, 86 may be parallel to each other as shown herein, or may lie in non-parallel planes.

During operation, the cooling fluid flow C is supplied to the interior cavity 88, into the inlet 92, through the passage 96 of the film hole 90, and out of the outlet 94 to create a thin layer or film of cool fluid (for example, air drawn from the compressor) over the hot surface 84, protecting it from the hot combustion gas flow H.

The passage 96 is generally defined between the upstream inner surface 95 and the downstream inner surface 97, and can include a metering section 98 for metering of the mass flow rate of the cooling fluid flow C, and a diffusing section 100 in which the cooling fluid C may expand to form a wider cooling film on the on surface 84 downstream of the outlet 94. The metering section 98 can be a portion of the passage 96 with the smallest cross-sectional area orthogonal to the direction of cooling fluid flow C through the passage 96.

The metering section 98 may be a discrete location at which the passage 96 has the smallest cross-sectional area, or an elongated section of the passage 96. The diffusing section 100 is downstream of the metering section 98 with respect to the direction of cooling fluid flow C through the passage 96, and is in serial flow communication with the metering section 98. As shown, the metering section 98 is provided at or near the inlet 92, while the diffusing section 100 is defined at or near the outlet 94. However, other embodiments may have a different orientation.

The passage 96, including within the metering section 98 and the diffusing section 100, is defined between an upstream surface 95 and a downstream surface 97, as shown in FIG. 3. It is noted that the upstream surface 95 and the downstream surface 97 are defined by the direction of the hot fluid flow H across the surface 84, even though this flow does not pass through the passage 96 in this embodiment. In one embodiment, the diffusion section 100 extends from the outlet 94 through at least 20% of the length of the downstream surface 97 of the passage 96, such as from the outlet 94 through about 20% to about 90% of the length of the downstream surface 97 of the passage 96 (e.g., about 33% to about 80%). Alternatively or additionally, the metering section 98 may extend from the inlet 92 through about 10% to about 50% of the length of the downstream surface 97 of the passage 96 (e.g., about 20% to about 33%). As used herein, the length of the downstream surface 97 is measured from the upstream edge 102 of the inlet 92 to the upstream edge 104 of the outlet 94.

In the particular embodiment shown in FIG. 3, the upstream wall 95 is substantially parallel to the downstream wall 97 in the metering section 98. However, in other embodiments, the upstream wall 95 can have a relatively small diverging or converging angle with respect to center axis 91, such as about 15° or less (e.g., about 10° or less).

Referring to FIG. 4, the passage 96 is also defined between a pair of side passage walls 106, 108 extending from the inlet 92 to the outlet 94. In the embodiment shown, the side passage walls 106, 108 define a diverging angle β1, β2, respectively, with respect to the center axis 91 as it extends toward the outlet 94 such that the passage has a greatest width at the outlet 94. In certain embodiments, the diverging angle β1, β2 of the respective side passage walls 106, 108 is about 1° to about 25° (e.g., about 2° to about 15°). Although shown diverging its entire length, the side passage walls 106, 108 may diverge only in the diffusing section 100 in particular embodiments.

In one particular embodiment, the surface roughness (Ra) of the side passage walls 106, 108 varies depending on its location within the passage 96. For example, each of the side passage walls 106, 108 can have, independently, a surface roughness (Ra) of about 4 mils to about 7 mils (e.g., about 5 mils to about 6 mils) within the diffusion section 100. However, each of the side passage walls 106, 108 can have, independently, a surface roughness (Ra) that is 1 mil or less (e.g., about 0.5 mil to 1 mil) within the metering section 98.

On the other hand, the surface roughness (Ra) of the upstream surface 95 and/or the downstream surface 97 may remain relatively low throughout the length the passage 96. For example, the upstream wall 95 can have a surface roughness (Ra) that is less than 1 mil (e.g., about 0.5 mil to 1 mil) within the diffusing section 100 and/or the metering section 98. Similarly, the downstream wall 97 can have a surface roughness (Ra) that is less than 1 mil (e.g., about 0.5 mil to 1 mil) within the diffusing section 100 and/or the metering section 98. FIG. 5 shows the side passage walls 106, 108 within the diffusion section 100 having a relatively rough surface, while the downstream surface 97 is relatively smooth.

Without wishing to be bound by any particular theory, it is believed that the geometry of the film holes 90 may be a result of its method of formation. For example, laser drilling with multiple blasts onto the cooling surface 86 to form the passage 96 extending to the hot surface 84 from the inlet may re-melt the CMC material nearest the inlet 94 more times than nearer the outlet as the laser drills into the thickness of the CMC component. Thus, the inner surface of the passage 96 may become smooth after multiple melt, cool, re-melt cycles nearer the inlet. Conversely, the inner surface of the passage 96 may remain rougher closer to the outlet where the inner surface is not exposed to as many melt, cool, re-melt cycles during the drilling process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An engine component for a gas turbine engine generating hot combustion gas flow, comprising:
   a substrate having a hot surface facing the hot combustion gas flow and a cooling surface facing a cooling fluid flow, and wherein the substrate defines a film hole extending through the substrate and having an inlet provided on the cooling surface, an outlet provided on the hot surface, and a passage connecting the inlet and the outlet, the passage being defined between a pair of side passage walls, an upstream wall relative to the hot combustion gas flow, and a downstream wall relative to the hot combustion gas flow, wherein:
   the passage defines a diffusion section and a metering section, the diffusion section extending downstream, relative to the cooling fluid flow, of the metering section to the outlet on the hot surface,
   each side passage wall of the pair of side passage walls within the diffusion section having a diffusing section surface roughness of 4 mils to 7 mils,
   each side passage wall of the pair of side passage walls within the metering section having a metering section surface roughness of less than or equal to 1 mil,
   the upstream wall having a surface roughness of 0.5 mil to 1 mil within the diffusion section and within the metering section, and
   the downstream wall having a surface roughness of 0.5 mil to 1 mil within the diffusion section and within the metering section.

2. The engine component as in claim 1, wherein the diffusing section surface roughness of each side passage wall of the pair of side passage walls within the diffusion section is 5 mils to 6 mils.

3. The engine component as in claim 1, wherein each of the side passage walls has a different diffusing section surface roughness within the diffusion section.

4. The engine component as in claim 3, wherein the diffusion section extends from the outlet through 20% to 90% of the length of the downstream wall.

5. The engine component as in claim 3, wherein the diffusion section extends from the outlet through 33% to 80% of the length of the downstream wall.

6. The engine component as in claim 1, wherein the metering section surface roughness of each side passage wall of the pair of side passage walls within the metering section is 0.5 mil to less than or equal to 1 mil.

7. The engine component as in claim 1, wherein each of the side passage walls has a different metering section surface roughness within the metering section.

8. The engine component as in claim 1, wherein the metering section extends from the inlet through 10% to 50% of the length of the upstream wall.

9. The engine component as in claim 1, wherein the metering section extends from the inlet through 20% to 33% of the length of the upstream wall.

10. The engine component as in claim 1, wherein the downstream wall within the metering section is substantially parallel to the upstream wall within the metering section.

11. The engine component as in claim 1, wherein, each side passage wall of the pair of the side passage walls within the diffusion section define a diverging angle going to the outlet such that the passage has a greatest width at the outlet.

12. The engine component as in claim 1, wherein each side passage wall of the pair of side passage walls extends with a diverging angle with respect to a passage axis, wherein the diverging angle is 1° to 25°.

13. The engine component as in claim 1, wherein the substrate comprises a ceramic matrix composite.

14. The engine component as in claim 13, wherein the substrate comprises a plurality of layers forming the ceramic matrix composite, and wherein an environmental barrier coating on the substrate defines the hot surface.

15. The engine component as in claim 14, wherein the film hole is a laser-drilled film hole, the laser-drilled film hole having an inner surface exposed to a plurality of melt, cool re-melt cycles, said exposure defining the diffusing section surface roughness and the metering section surface roughness.

16. The engine component of claim 1, wherein the upstream wall has a different surface roughness than the downstream wall.

* * * * *